United States Patent [19]
Blaze

[11] Patent Number: 5,696,823
[45] Date of Patent: Dec. 9, 1997

[54] HIGH-BANDWIDTH ENCRYPTION SYSTEM WITH LOW-BANDWIDTH CRYPTOGRAPHIC MODULES

[75] Inventor: Matthew A. Blaze, Jersey City, N.J.

[73] Assignee: Lucent Technologies Inc., Murray Hill, N.J.

[21] Appl. No.: 415,015

[22] Filed: Mar. 31, 1995

[51] Int. Cl.⁶ .................................. H04L 9/08; H04L 9/00
[52] U.S. Cl. ......................... 380/21; 380/9; 380/49; 380/50
[58] Field of Search ........................... 380/9, 21, 36, 380/37, 49, 50

[56] References Cited

U.S. PATENT DOCUMENTS

| | | | |
|---|---|---|---|
| 4,274,085 | 6/1981 | Marino, Jr. | 380/50 X |
| 4,941,176 | 7/1990 | Matyas et al. | 380/21 |
| 5,081,678 | 1/1992 | Kaufman et al. | 380/21 |

*Primary Examiner*—Bernarr E. Gregory

[57] ABSTRACT

A cryptographic system enables a secure, but low-bandwidth, cryptographic module, such as a smartcard or PCMCIA device, to serve as a high-bandwidth secret-key encryption decryption engine which uses the processing power of an untrusted, but fast, host processor without revealing the secret key to that host processor.

18 Claims, 3 Drawing Sheets

HIGH-BANDWIDTH ENCRYPTION SYSTEM WITH LOW-BANDWIDTH CRYPTOGRAPHIC MODULES

TECHNICAL FIELD

This invention relates to cryptographic modules and their interactions with host processors.

BACKGROUND OF THE INVENTION

Cryptographic modules, such as smartcards, are an important building block in many modern security applications. In particular, smartcards' tamper-resistant packaging, low cost, inherent portability, and loose coupling to a host make them especially attractive for use as secret key storage tokens when the host cannot be trusted to itself store a secret key. Unfortunately, these same attractive properties may also limit the utility of smartcards for certain applications. For example, the loose coupling and low cost properties of a smartcard typically imply that the card cannot process data at nearly the speed of the host to which it is coupled.

Because bandwidth requirements are minimal in some applications (such as digital signatures), the low bandwidth of smartcards is not an impediment to their implementation in those applications. Other applications, however, (such as, file encryption, encrypted real-time traffic, and encrypted multimedia and video) by their very bandwidth-intensive nature, require the encryption and decryption of large amounts of data under the smartcard's secret key. For those applications, the bandwidth of existing smartcards is a serious bottleneck because the speed of the entire system is limited by the latency and bandwidth of the card interface as well as the computational capability of the microprocessor embedded in those smartcards.

In response to this problem, consideration has been given to engineer a smartcard (and its interface to the host or the card reader) so that its processing performance rivals the processing capability of the attached host. This is not always technologically feasible when one considers the stringent dimension requirements of smartcards. More importantly, increasing the processing performance of a smartcard to match the processing capability of an attached host would significantly increase the total cost of the system, perhaps prohibitively for most applications. Other solutions propose limiting smartcards operations to key storage functions only, thereby shifting as much of the processing load as possible from the slow, computationally limited smartcard to the much faster and powerful processing capabilities of the host. Those solutions defeat the purpose of using a smartcard for security purposes since implementation of those solutions requires making the key available to the host, prior to the performance of any cryptographic task. Hence, implementation of those solutions implies that the host processor is trusted with the key, which opens the door for a wide variety of security breaches. Thus, a problem of the prior art is the lack of a secure cryptographic system for encryption and decryption of large amounts of data using a smartcard's secret key.

SUMMARY OF THE INVENTION

The present invention is directed to a system that enables a trusted, but low-bandwidth, cryptographic module to serve as a high-bandwidth secret-key encryption/decryption engine that uses the processing power of an untrusted, but fast, host processor for performing a substantial amount of the encrypting/decrypting tasks without revealing the secret key to the host. The cryptographic module may be, for example, a smartcard or a standard-conforming Personal Computer Memory Card International Association (PCMCIA) device.

In an embodiment of the principles of the invention, a host processor derives a compact representation of a block of data that is received by the host. The compact data representation is then transmitted to the cryptographic module which encrypts the compact data representation under a cryptographic key stored therein, to form a block key that is returned to the host. The host then encrypts the block of data under the block key. This process is repeated for every block of plain text data received by the host such that there is no useful correlation between the key for one block and the key for another. In accordance with a feature of the invention, the compact representation of the block of plain text data may be included in the encrypted block of plain text data. Furthermore, the size of the resulting ciphertext may be equal to the size of the plain text data in order to make the encryption process transparent to other applications that may be running on the host.

Decryption of the encrypted data is accomplished by reversing the encryption process described above. Specifically, when the host receives a block of ciphertext in the form of encrypted data and a compact representation of that block of encrypted data, the host transmits the compact representation of that block of ciphertext to the cryptographic module. The cryptographic module uses its cryptographic key and the received compact representation of the block of ciphertext to recover the block key. The cryptographic module then returns the block key to the host which uses that key to decrypt the block of ciphertext.

DETAILED DESCRIPTION

Figure 1:
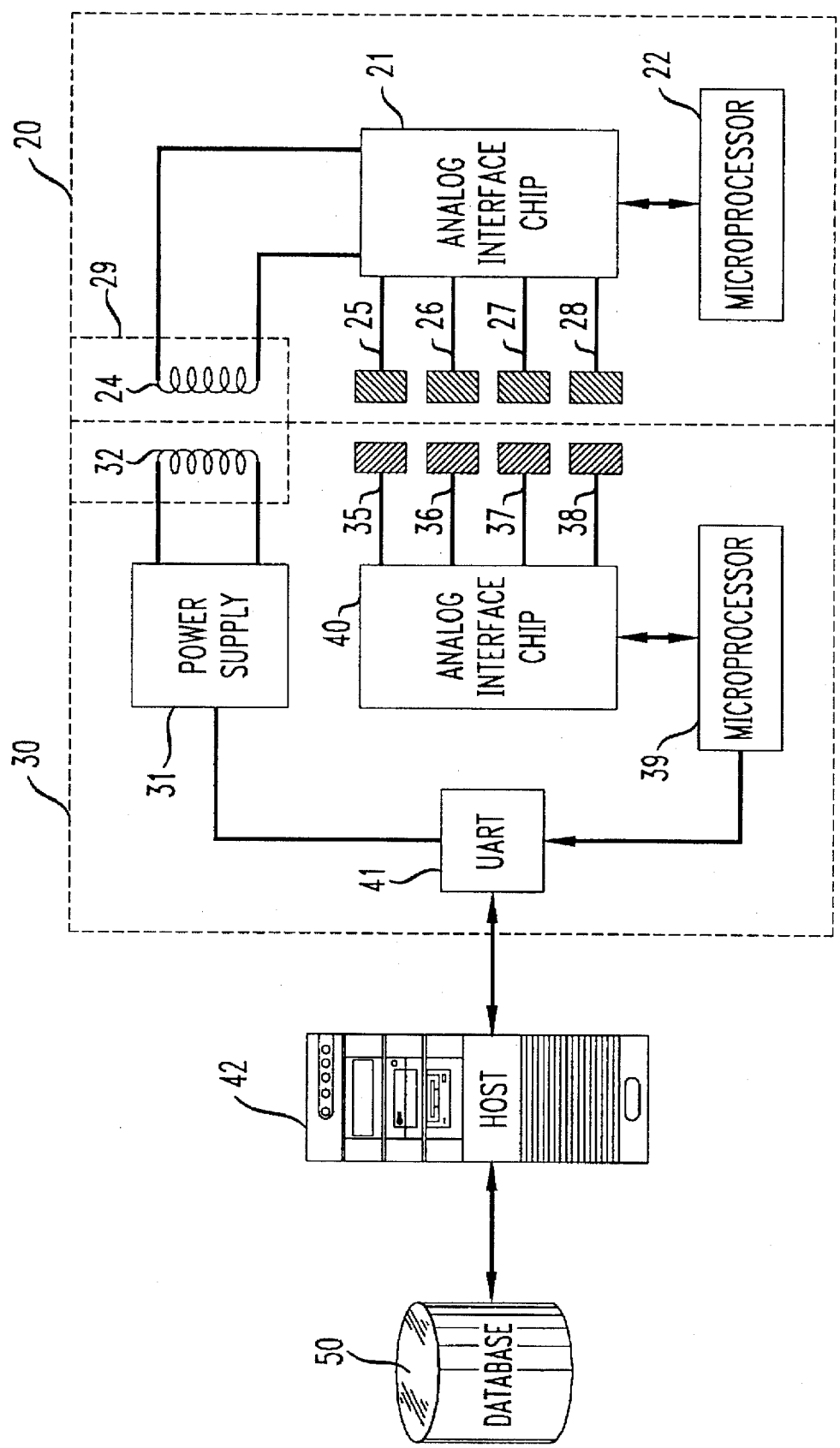
FIG. 1 is a block diagram of a system designed to use the encryption/decryption arrangement of the invention.

FIG. 1 is a block diagram of a system designed to use the encryption/decryption arrangement of the invention. The block diagram of FIG. 1 shows a portable encrypting module or smartcard 20, a card reader/writer 30 and a host 42. Although card reader/writer 30 is shown in FIG. 1 as a separate, stand-alone component, it is to be understood that card reader/writer 30 may be included in host 42.

Major components of smartcard 20 include a microprocessor 22, an analog interface chip 21, the inductive coil 24 of a transformer 29, and capacitive plates 25 through 28. All smartcard components are preferably laminated beneath the smartcard surface such that no external contacts are accessible to intruders. The microprocessor 22 has a central processing unit and internal memory units that store some of the programmed instructions shown in FIGS. 2 and 3. The internal memory units of microprocessor 22 also store protocols and associated software programs that are executed by microprocessor 22 to transmit and receive data to and from host 42, respectively, via the card reader/writer 30. Those software programs also include a block cipher algorithm, such as the well-known Data Encryption Standard (DES) algorithm that is used in conjunction with the programmed instructions shown in FIGS. 2 and 3 to encrypt and decrypt data under a cryptographic key also stored in the internal memory units of microprocessor 22.

Of particular significance among the attributes of smartcard 20 is a) the limited computational power of microprocessor 22 which allows smartcard 20 to encrypt and decrypt limited amount of data within a particular time period, and b) the limited bandwidth of the link between smartcard 20 and the host.

All input to, and output from, smartcard 20 is channeled to analog interface chip 21 which transfers information to and from microprocessor 22 and distributes electrical power from the card reader/writer 30 to the smartcard 20. Specifically, when analog interface chip 21 receives power through the mating of inductive coils 24 and 32 of transformer 29, analog interface chip 21 conditions the electrical power before distributing it to microprocessor 22. Likewise, clock recovery and signal conditioning is performed by analog interface chip 21 for data transferred thereto via the mating of capacitive plates 25, 26, 27 and 28 of smartcard 20 to capacitive plates 35, 36, 37 and 38 of card reader/writer 30. Because of the limited dimensions of smartcard 20, capacitive plates 25, 26, 27 and 28 can only carry limited amount information from card reader/writer 30 to smartcard 20. Hence, smartcard 20 is bandwidth-limited in addition to being CPU-limited.

In addition to the components of card reader/writer 30 already described above with respect to electrical power and data transfer features of smartcard 20, card reader/writer 30 also includes a power supply 31, a Universal Asynchronous Receiver Transmitter (UART) 41, a microprocessor 39 and analog interface circuit 40. Some of the components included in the smartcard 20 may also be used in the card reader/writer 30. For example, the same physical microprocessor can be used for both microprocessor 22 and 39. Similarly, the data transfer features of analog interface chip 21 and 42 can be almost identical. Power supply 31 provides electrical power to card reader/writer 30 and smartcard 20 when the latter is coupled to the former. Power supply 31 also synchronizes a clock signal from the card reader/writer 30 to the smartcard 20 through the transformer 29. The UART 41 is primarily a physical interface that is arranged to receive and transmit asynchronous data according to a specific standard. UART 41 communicates clock synchronization signals to power supply 31 and transfers data received from host 42 to microprocessor 39 and likewise, transmits data received from microprocessor 39 to host 42.

Host 42 is a general purpose computer that receives plain text data and/or ciphertext from a data source 50 which is shown in FIG. 1 as a data storage area. executes software programs stored in processor 42 internal memory (not shown). Alternatively data source 50 may be a communications network arranged to transmit to, and receive from host 42 data associated with diverse applications ranging from database management systems to multimedia applications. Host 42 stores in its memories software programs and some of the programmed instructions shown in FIGS. 2 and 3. Chief among the software programs executed by host 42 is an encryption/decryption algorithm, such as the DES algorithm, that allows plain text (or ciphertext) data to be encrypted (decrypted) under one or more cryptographic keys. Instructions included in this algorithm allow host 42 to operate on large blocks of plain text data B and ciphertext C, each consisting of a series of n individual b bit blocks, denoted $B_1 \ldots B_n$ and $C_1 \ldots C_n$, respectively.

Also stored in the internal memories of host 42 are programmed instructions for a public function that returns a cryptographic hash of an arbitrary length bitstring. In this example, host 42 is trusted to process the plain text data received from source 50. However, host 42 is not allowed to know the cryptographic key stored in the internal memories of microprocessor 22 embedded in smartcard 20. Hence, host 42 is arranged to perform a single, low-bandwidth interaction with smartcard 20 to obtain enough information to encrypt or decrypt a single arbitrary length block. Without smartcard 20 assistance and cooperation, however, host 42 cannot use the information received from smartcard 20 to encrypt or decrypt other blocks.

Figure 2:
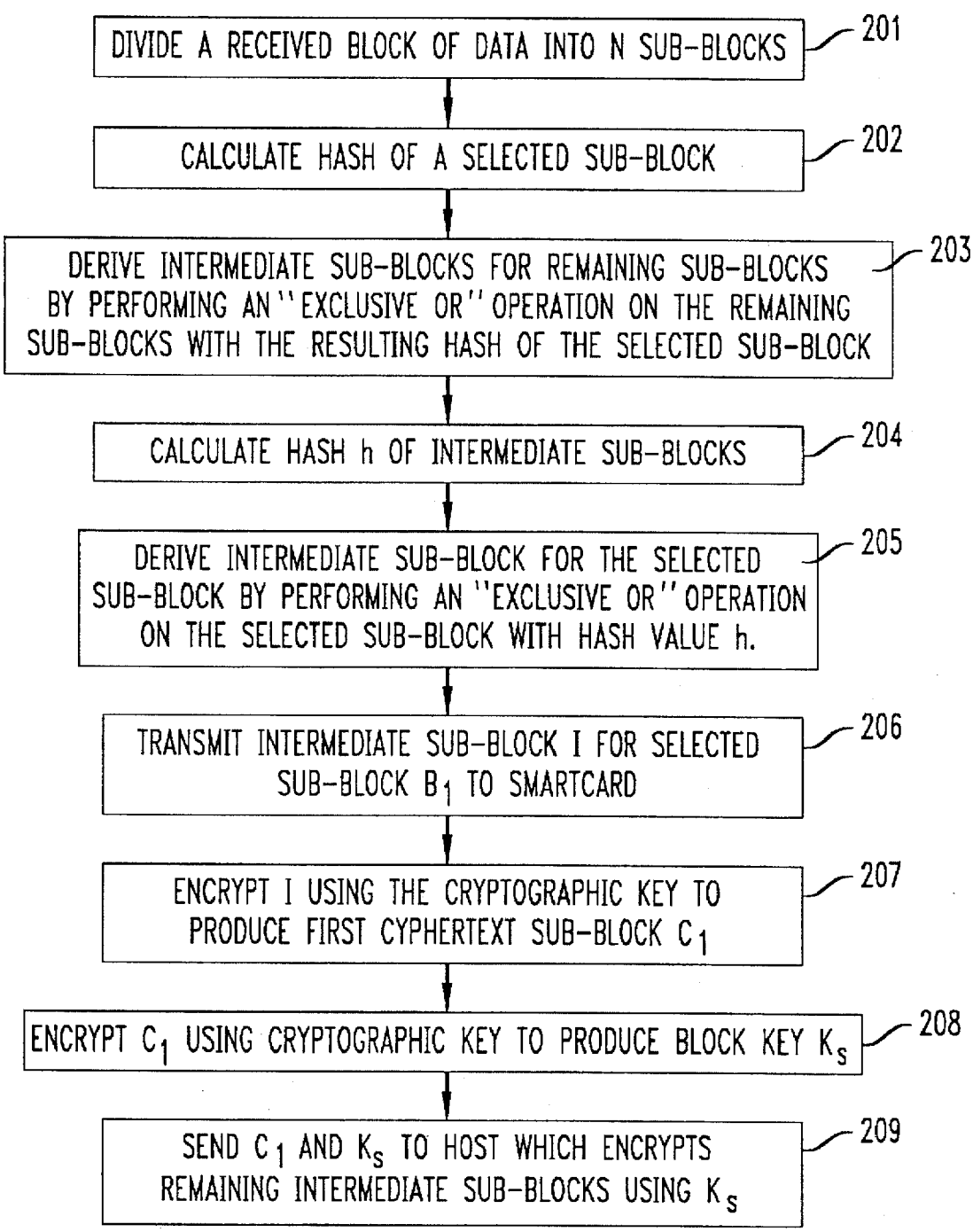
FIGS. 2, and 3, are flow diagrams of programmed instructions executed by some of the components of FIG. 1 to encrypt and decrypt data in accordance with the principles of the invention.

FIG. 2 is flow diagram of programmed instructions executed by host 42 and smartcard 20 to implement the principles of the invention. When host 42 receives a block of plain text data from source 50, it divides the block of data into N sub-blocks $B_1$ to $B_n$, as indicated in step 201. While the size of a received block of data is application-dependent, the size of each sub-block, however, is determined by the cipher function. The division of the block of plain text data is performed to derive a compact representation of the block, i.e., a so-called message digest of the block. In this example, the compact representation of the block of plain text data is achieved by diffusing all the bits in the block. Specifically, the compact representation function is initiated when host 42, in step 202, selects one of the sub-blocks, such as sub-block $B_1$, for example, to calculate the hash of the bits in that sub-block to produce the resulting hash $H(B_1)$ Thereafter, host 42, in step 203, performs an "exclusive or" operation on the remaining sub-blocks $B_2$ to $B_n$ with the value of the hash $H(B_1)$ to produce intermediate sub-blocks $I_2 \ldots I_n$ Then, host 42, in step 204, calculates the hash value h of the intermediate sub-blocks $I_2 \ldots I_n$. Intermediate sub-block $I_1$ is then derived by host 42, in step 205, through an "exclusive or" operation of sub-block $B_1$ with the hash value h. Host 42, in step 206, transmits to smartcard 20 intermediate sub-block $I_1$. It will be appreciated that sub-block $I_1$ contains indicia of all the bits in the block of plain text data as a result of the hash and "exclusive or" operations described above. In other words, all the bits in the block of plain text data have been diffused to produce $I_1$.

Upon receiving intermediate sub-block $I_1$, smartcard 20, in step 207 encrypts intermediate sub-block $I_1$ under its cryptographic key K to produce encrypted sub-block $C_1$. Smartcard 20 proceeds, in step 208 to encrypt $C_1$ under the cryptographic key K to produce block key $K_s$. Thereafter, smartcard 20, in step 209, sends encrypted sub-block $C_1$ to host 42 which encrypts the intermediate blocks $I_2$ to $I_n$ under the block key $K_s$ to produce ciphertext $C_2$ to $C_n$ for sub-blocks $B_2$ to $B_n$. Optionally, this encryption may be performed with a chaining cipher, such as the cipher block chaining process defined in the *Federal Information Processing Standards Publication* 81, Government Printing Office, Washington, D.C., 1980.

Figure 3:
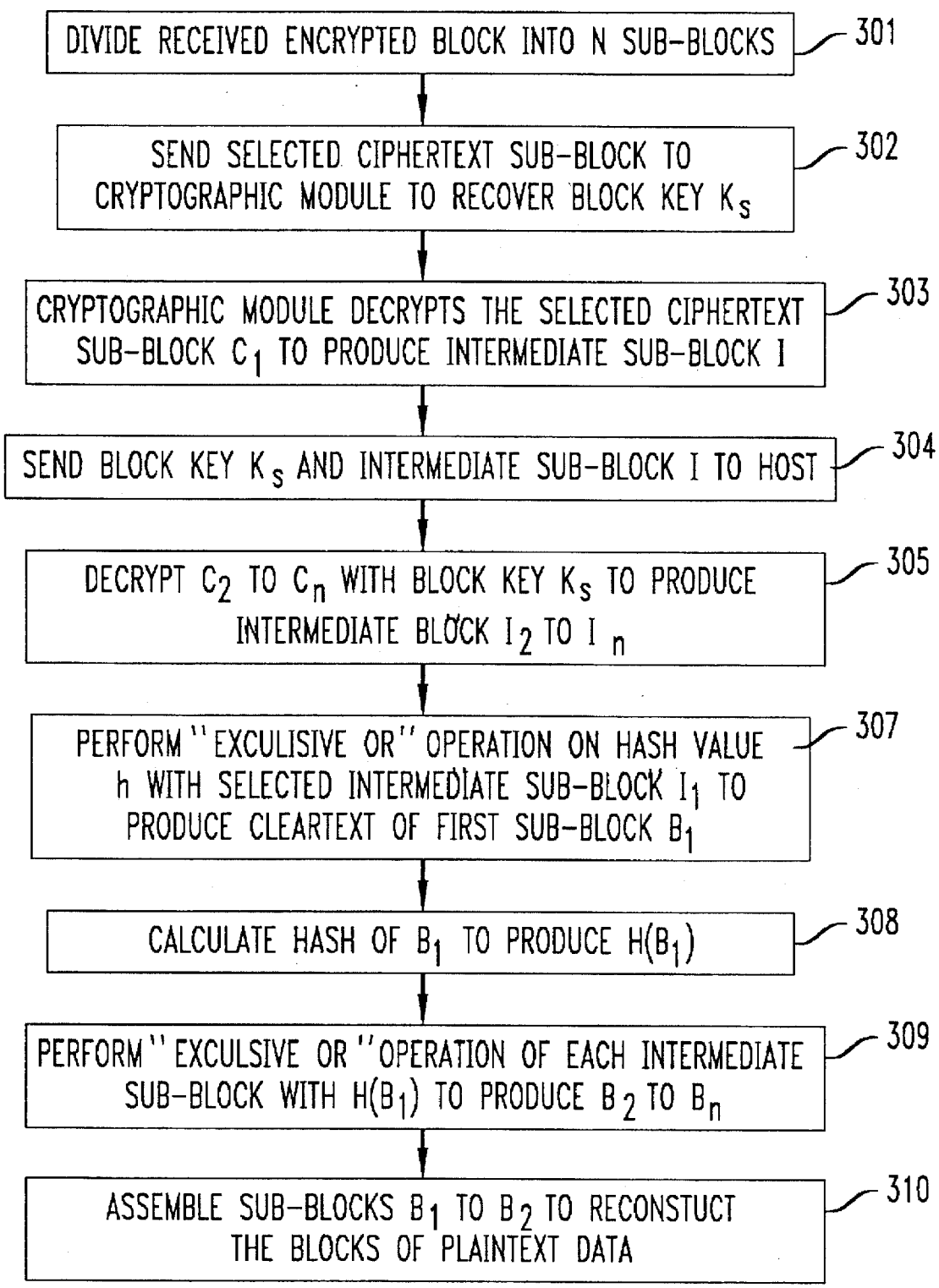

FIG. 3 presents, in flow diagram format, programmed instructions executed by host 42 and smartcard 20 to decrypt a block of ciphertext data in accordance with the principles of the invention. When host 42 receives a block of ciphertext data, it divides that block of data into n sub-blocks $C_1$ to $C_n$, as indicated in step 301. Host 42, sends the first ciphertext sub-block $C_1$ to smartcard 20 which encrypts the data in the first ciphertext sub-block $C_1$, in step 302 to derive the block key $K_s$. Thereafter, smartcard 20, in step 302, decrypts the first ciphertext sub-block $C_1$ to derive the intermediate sub-block $I_1$ which is sent to host 42 along with the block key $K_s$. Host 42, in step 303 uses the block key $K_s$ to decrypt $C_2$ to $C_n$ to recover intermediate sub-blocks $I_2$ to $I_n$. Host 42 proceeds in step 304 to calculate the hash value h for intermediate sub-blocks $I_2$ to $I_n$. Thereafter, host 42 recovers $B_1$ by performing an "exclusive or" operation on the intermediate sub-block $I_1$ received from smartcard 20 with the hash value h. Host 42, in step 305, calculates the hash of the bits in that sub-block $B_1$ to produce the resulting hash H ($B_1$). Host 42 then, in step 406, recovers sub-blocks $B_2$ to $B_n$. Host 42 in step 407 assembles sub-blocks $B_1$ to $B_n$ to reconstruct the block of plain text data. Table I and Table II show illustrative programming code for the encryption and decryption process, respectively, for this example.

TABLE 1

Encription of B to obtain C

| Host | Card |
|---|---|
| do $\iota = 2$ to n | |
| $I_\iota = B_\iota \oplus H(B_1)$ | |
| $h = H(I_2 \ldots I_n)$ | |
| $I_1 = B_1 \oplus h$ | |
| send $I_1$ to card | |
| | $C_1 = E_K(I_1)$ |
| | $K_s = M(E_K(C_1))$ |
| | send $C_1$, $K_s$ to host |
| do $\iota = 2$ to n | |
| $C_i = E_{K_s}(I_\iota \oplus C_{\iota-1})$ | |

TABLE 2

Decryption of C to obtain B

| Host | Card |
|---|---|
| send $C_1$ to card | |
| | $K_s = M(E_K(C_1))$ |
| | $I_1 = D_K(C_1)$ |
| | send $K_s$, $I_1$ to host |
| do $\iota = 2$ to n | |
| $I_\iota = D_{K_s}(C_\iota) \oplus C_{\iota-1}$ | |
| $h = H(I_2 \ldots I_n)$ | |
| $B_1 = I_1 \oplus h$ | |
| do $\iota = 2$ to n | |
| $B_\iota = I_\iota \oplus H(B_1)$ | |

It is worth noting that the decrypting process described above implicitly assumes that the compact representation of the encrypted block is included in the data contained in that block. However, the principles of the invention can be implemented without this requirement.

Optionally, an authentication process can be added to the encryption and decryption tasks to detect any tampering with the ciphertext. This authentication process may simply consist of setting the first bits of each block to some fixed value (say, all zeros). By checking those bits on decryption, any tampering with the ciphertext becomes easily detectable.

Advantageously, any size block can be encrypted or decrypted with one card interaction, with the card performing only two cipherblock operations for either encrypting or decrypting a block of data. Furthermore, host 42 can neither encrypt nor decrypt data without on-line access to smartcard 20. In other words, encryption and decryption without the card is no easier than breaking the underlying cipher even for hosts that have had prior interaction(s) with the card.

The foregoing is to be construed as only being an illustrative embodiment of this invention. Persons skilled in the art can easily conceive of alternative arrangements providing functionality similar to this embodiment without any deviation from the fundamental principles or the scope of this invention.

I claim:

1. A method of encrypting data comprising the steps of receiving at a cryptographic module a hash value representing a block of data from a host;

encrypting the hash value at the cryptographic module using a cryptographic key stored in the cryptographic module to form a block key;

transmitting the block key to the host; and receiving the block key at the host and encrypting the block of data using the received block key.

2. The method of claim 1 wherein said encrypting step of said block of data further includes the step of:

encrypting said block of data such that a resulting encrypted block of data has an equal number of bits as its non-encrypted counterpart.

3. The method of claim 1 wherein said hash value is derivable from the encrypted block of data.

4. A method of decrypting data comprising the steps of:

at a host receiving a block of ciphertext and a message digest of the block of ciphertext;

transmitting the message digest of the block of ciphertext to a cryptographic module;

at the cryptographic module recovering a block key previously used to produce the block of ciphertext; said recovering being performed using the cryptographic key;

transmitting the block key to host; and at the host decrypting the block of ciphertext using the block key.

5. The method of claim 4 wherein the message digest of the block of ciphertext is included in the block of ciphertext received by the host.

6. A cryptographic system comprising means for receiving at a cryptographic module a value representing a block of data from a host;

means for encrypting said value at the cryptographic module using a cryptographic key stored in the cryptographic module to form a block key;

means for transmitting the block key to the host; and means for receiving the block key at the host and for encrypting the block of data using the received block key.

7. The invention of claim 6 wherein said value is derivable from the encrypted block of data.

8. The method of claim 6 wherein said means for encrypting said block of data further includes:

means for ensuring that an encrypted data block has an equal number of bits as its non-encrypted counterpart.

9. A cryptographic system comprising a host which includes means for receiving a block of ciphertext and a value representing the block of ciphertext;

means for transmitting said value to a cryptographic module;

a cryptographic module which includes means for recovering a block key previously used to produce the block of ciphertext; said recovering being performed using the cryptographic key;

means for transmitting the block key to host; and means for decrypting at the host the block of ciphertext using the block key.

10. The invention of claim 9 wherein said value is included in the block of ciphertext received by the host.

11. A method of encrypting blocks of data, said method comprising the steps of:

at a host
 receiving a block of data that is divided therein into sub-blocks from which at least one sub-block is selected, wherein each sub-block contains a plurality of bits of data;
 modifying each bit in the at least one selected sub-block such that each one of said bits is dependent on every bit in the block of data to create a value representing the entire block;
 transmitting said value to a cryptographic module having access to a cryptographic key;

at the cryptographic module
 encrypting said value at least once using the cryptographic key to form a block key and transmitting the block key to the host at the host
 encrypting said sub-blocks of data using the block key.

12. The method of claim 11 wherein the block key is formed by a) a first encryption of said value to produce a ciphertext for the at least one selected sub-block, and b) a second encryption of said Ciphertext to derive the block key.

13. A processor for encrypting data, said processor comprising
 a receiver means for receiving in said processor a block of data, said block containing a plurality of bits;
 a transmitter means for sending to a cryptographic module that stores a first cryptographic key, indicia of at least a subset of said bits in order to obtain a second cryptographic key that is comprised of information transformed at least once under said first cryptographic key without being indicative of said first cryptographic key; and
 means for encrypting at least a portion of the data in said block of data under the second cryptographic key.

14. A processor for use to decrypt data, said processor comprising:
 a receiver means for receiving in said processor a block of data previously transformed under a first cryptographic key, said block of data including a plurality of segments transformed under a second cryptographic key which is a function of said first cryptographic key and data in said segments;
 a transmitter for sending to a cryptographic module indicia associated with data stored in a predetermined one of said segments in order to identify thereto said second cryptographic key which is returned by said cryptographic module to said processor; and
 means for decrypting at least a subset of said segments using said second cryptographic module.

15. A cryptographic module comprising:
 means for storing a cryptographic key;
 means for receiving from a processor which is coupled to said cryptographic module a representation of at least a subset of bits received by said processor as part of a block of plain text data;
 means for performing on said representation of said subset of bits at least one transformation operation under said cryptographic key to derive a different cryptographic key that is transmitted to said host in order for said host to encrypt the bits in said block under said different cryptographic key.

16. A cryptographic module comprising
 means for storing a first cryptographic key;
 means for receiving from a processor which is coupled to said cryptographic module at least one sub-block of ciphertext data from a group of such sub-blocks which were a) previously encrypted under a second cryptographic key that is a function of said first cryptographic key and data in said sub-blocks, and b) received by said processor as part of a block of ciphertext data; and
 means for deriving from said selected sub-block of encrypted data said second cryptographic key that is transmitted to said processor in order for said processor to decrypt the remaining sub-blocks of encrypted data without knowing said first cryptographic key.

17. A cryptographic system comprising
 a first apparatus for encrypting subsets of a block of data using a first cryptographic key to obtain a second cryptographic key;
 means for transmitting from the first apparatus said second cryptographic key to a second apparatus; and
 means for encrypting at said second apparatus said block of data using said second cryptographic key.

18. A cryptographic method comprising the steps of:
 encrypting at a first apparatus subsets of a block of data using a first cryptographic key to obtain a second cryptographic key;
 transmitting from the first apparatus said second cryptographic key to a second apparatus; and
 encrypting at said second apparatus said block of data using said second cryptographic key.

* * * * *